G. W. COLE.
TRUNDLE-TOY.
No. 179,896. Patented July 18, 1876.
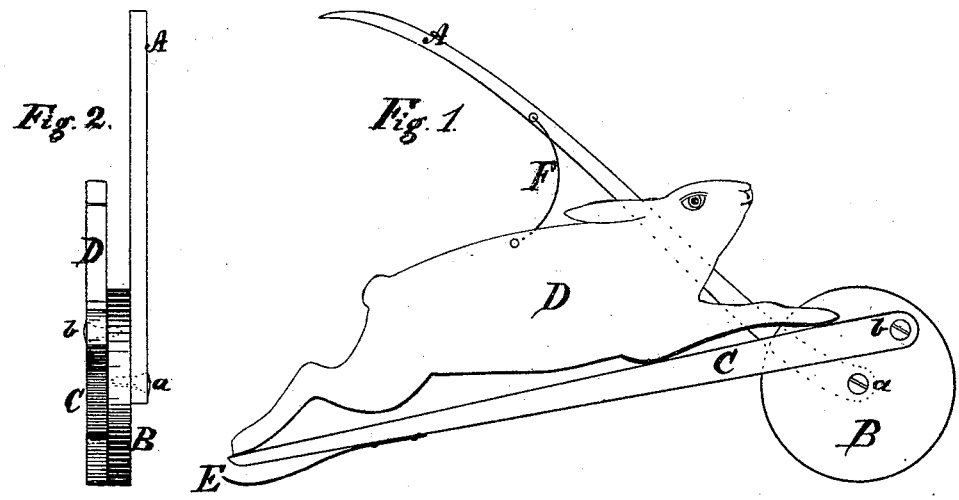
Witnesses
G. B. Durkee
G. E. Fuller
Inventor
Gideon. W. Cole.

UNITED STATES PATENT OFFICE.

GIDEON W. COLE, OF CANTON, ILLINOIS.

IMPROVEMENT IN TRUNDLE TOYS.

Specification forming part of Letters Patent No. 179,896, dated July 18, 1876; application filed April 25, 1876.

*To all whom it may concern:*

Be it known that I, GIDEON W. COLE, of Canton, in the county of Fulton and State of Illinois, have invented a new and useful Mechanical Toy, which is fully set forth in the following specification, reference being had to the accompanying drawing.

The nature and object of my invention are to produce a mechanical trundle toy, so constructed as to have a leaping motion, and it may represent a horse, rabbit, or other animal or figure; and it consists, principally, in attaching the figure or representation of an animal to a drag-bar, having its forward end pivoted near the outer edge of a wheel or disk, to the center of which a suitable handle is attached, for the purpose of propelling the same. It consists, further, in the means employed for giving the animal or figure a bounding motion, and also for preventing it from bounding or leaping too high.

In the accompanying drawing, Figure 1 is a side elevation of my improved toy, and Fig. 2 is a front elevation of the same, in which—

A represents the handle, which is attached to the wheel B at *a*, the drag-bar C being attached to the opposite side of the said wheel at *b*, and the figure or animal representation D being secured to the upper side of the drag-bar, at the rear end of which is attached, on the under edge, a spring, E. From the handle A to the figure D a cord, F, is attached.

The action of this mechanical toy, when in operation, is as follows: Being pushed forward by the handle, with the wheel in contact with a sidewalk or other suitable plane, it is caused to revolve, carrying the front end of the drag-bar, giving it, and whatever object is attached to it, an alternate upward and forward motion. The rear end, resting on the spring E, has a bounding motion, produced by the spring when the toy is propelled at a suitable speed. The cord F prevents the animal or figure from bounding or leaping too high.

It is obvious that the drag-bar, or a portion of it, may be dispensed with by extending the fore foot of the animal to the point where the drag-bar is now attached; but that portion which is extended farther than the natural proportion of the leg should be painted a different color from that of the animal. The foot of the animal or figure may be attached directly to the wheel; but I prefer to attach it farther back, for the purpose of diminishing somewhat the upward and downward motion, while the forward motion remains the same. The figure, when thus attached, is not in any way hidden from view by the wheel.

In constructing this toy of wood the figure or picture of the animal may be printed on paper, and pasted to the wood on both sides, the lower part, between the animal and the drag-bar, being solid, of one piece, thereby dispensing with the drag-bar as a separate part.

Having thus described my invention, what I claim, and desire to secure by Letters Patent, is—

1. The trundle toy herein described, consisting of the handle A, wheel B, and the animal figure, supported by drag-bar C, pivoted eccentrically to said wheel at one end, and free at the other, substantially as and for the purpose described.

2. In combination with the subject-matter of the preceding claim, the spring E, substantially as and for the purpose specified.

3. The cord F, connecting the handle A and animal figure D, substantially as described, for the purpose of preventing an elevation of said animal figure above the natural leaping motion.

GIDEON W. COLE.

Witnesses:
G. B. DURKEE,
G. E. FULLER.